June 15, 1926.
J. COLTHARP
COTTON CHOPPER
Filed Sept. 1, 1923
1,588,944
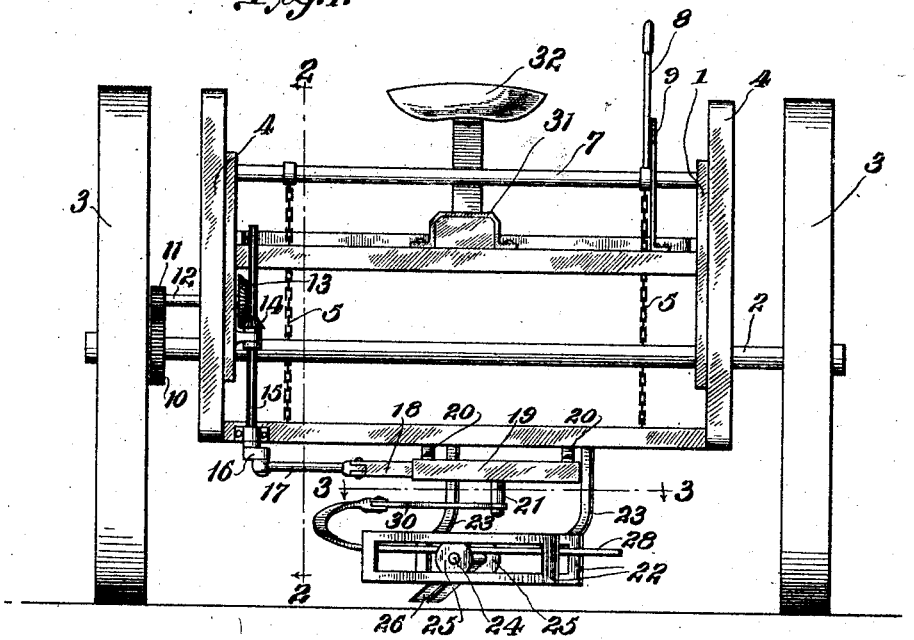
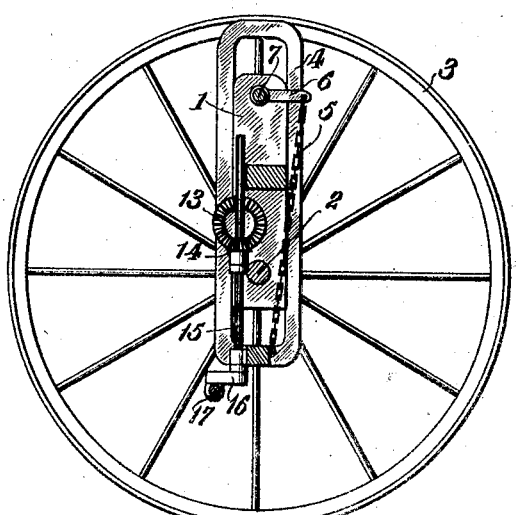
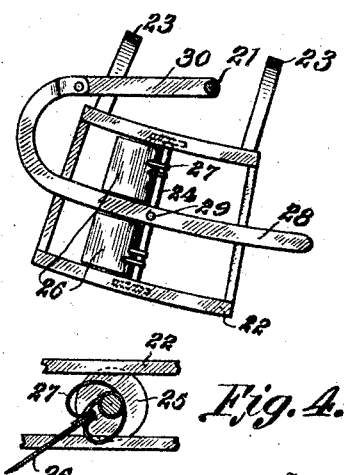
Inventor
James Coltharp.
By Beall & Fawick.
Attorneys Patented June 15, 1926.

1,588,944

UNITED STATES PATENT OFFICE.

JAMES COLTHARP, OF BLUE MOUNTAIN, MISSISSIPPI.

COTTON CHOPPER.

Application filed September 1, 1923. Serial No. 660,554.

This invention relates to improvements in agricultural implements and especially to improvements in cotton choppers which are used for thinning out rows of young cotton.

An object of the invention is to provide an improved cotton chopper which will be driven from the machine or apparatus upon which it is mounted and which will be so mounted that it will be vertically adjustable with respect to the ground.

Another object of the invention is to provide an improved cotton chopper which will be provided with a pair of laterally reciprocating blades and roller means for guiding the same.

A further object of the invention is to provide a cotton chopper which will be provided with a pair of resiliently mounted transversely reciprocating blades, the same being vertically adjustable with respect to the ground.

A still further object of the invention is to provide an improved cotton chopper which will be highly efficient in use and quite inexpensive to manufacture.

Other objects will appear as the description proceeds.

In the accompanying drawings which form a part of my application,

Fig. 1 is a rear elevation of my improved cotton chopper.

Fig. 2 is a sectional view taken on line 2—2 of Fig. 1.

Fig. 3 is a sectional view taken on line 3—3 of Fig. 1, and

Fig. 4 is a detailed end view of one of the chopping knives showing the resilient mounting therefor.

Like characters of reference are used throughout the following specification and accompanying drawings to designate corresponding parts.

The stationary frame 1 has mounted transversely across it the axle 2 which in turn supports at its opposite ends the wheels 3.

A vertically adjustable slidable frame 4, preferably yoke shaped, is mounted upon the frame 1 and has attached to its lower portion the elevating chains 5 which are secured at their opposite ends to the lever 6 fixed to the shaft 7. An operating lever 8 is fixed to the shaft 7 and is provided with suitable means for cooperating with the segment 9 carried on the frame 1, so that when the said lever 8 is moved in one direction the frame 4 will be elevated and when moved in the opposite direction the said frame 4 will be lowered.

The gear wheel 10 is fixed on the axle 2 between one of the wheels 3 and the end of the frame 4 and is adapted to intermesh with the smaller gear wheel 11 at one end of the shaft 12. The shaft 12 is rotatably mounted through the frame 1 and carries on its inner end a bevel gear 13 which is adapted to intermesh with a smaller bevel gear 14 slidably but non-rotatably mounted on the vertically mounted shaft 15. The shaft 15 is journaled on a bracket on frame 4 and slidable therethrough, the gear 14 being engaged between the bracket and gear 13 as illustrated. A crank 16 is fixed to the lower end of the shaft 15 and is connected with one end of the connecting link 17. The opposite end of the link 17 is detachably connected to one end of the sliding member 18 which is slidably mounted in the guide member 19, the same being suitably held in the frame 1 by means of the brackets 20. A downwardly extending pin or lug 21 is carried by the slide member 18 and slides in a slot in the lower surface of the guide member 19.

Depending from the adjustable frame and supported thereon by brackets 23 is an arcuate frame comprising spaced concentric track members 22.

A suitable tongue is attached to the frame 1, as is also a seat for the operator of the said apparatus.

From the foregoing description it will be apparent that when the cotton chopper is drawn down the rows of cotton that the plates 26 will be reciprocated transversely across the rows and with a drawing action to cut out some of the plants, thereby thinning out the same. The drawing or slicing operation of the blades will be caused by the movement of the blade support in the concentric spaced arcuate tracks. It will further be seen that the power for operating the cutter plates will all be furnished through the connections with the apparatus so that when the apparatus is moved the cutter plates will be operated.

As before mentioned the frame 4 may be vertically adjusted by means of the operating lever 8 so that the plates 26 may cut in the desired manner.

Many minor changes in detail of construction may be resorted to without departure from the spirit of the invention.

Having thus described my invention what I claim as new and desire to secure by Letters Patent of the United States is:

A cotton chopper comprising an axle, ground contacting wheels fixedly secured to the ends of the axle, vertical guide members journalled on the axle one adjacent each end, means for spacing said guide members, yoke members slidable one on each of said guide members, means connecting said yoke members, means for raising and lowering said yoke members in unison, arcuate concentric track members supported by said yoke members, a roller shaft positioned radially between said track members, blades resiliently secured in oblique relation to the ground, upon the roller shaft, and means operated by rotation of the axle and effective in any adjusted position of the yoke members for reciprocating the roller shaft on said arcuate tracks substantially as specified.

In testimony whereof I affix my signature.

JAMES COLTHARP.